US009710537B2

(12) United States Patent
Nojima

(10) Patent No.: US 9,710,537 B2
(45) Date of Patent: Jul. 18, 2017

(54) DATA COLLECTION SYSTEM AND DATA COLLECTION SYSTEM PROGRAM

(75) Inventor: Akira Nojima, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 277 days.

(21) Appl. No.: 14/356,721

(22) PCT Filed: Jun. 26, 2012

(86) PCT No.: PCT/JP2012/066201
§ 371 (c)(1),
(2), (4) Date: May 7, 2014

(87) PCT Pub. No.: WO2014/002179
PCT Pub. Date: Jan. 3, 2014

(65) Prior Publication Data
US 2014/0289251 A1    Sep. 25, 2014

(51) Int. Cl.
*G06F 17/30* (2006.01)
*G05B 19/418* (2006.01)
(Continued)

(52) U.S. Cl.
CPC ....... *G06F 17/30598* (2013.01); *G05B 15/02* (2013.01); *G05B 19/4183* (2013.01);
(Continued)

(58) Field of Classification Search
None
See application file for complete search history.

(56) References Cited

U.S. PATENT DOCUMENTS

| 5,448,230 A * | 9/1995 | Schanker | G08C 15/00 340/12.37 |
| 7,035,240 B1 * | 4/2006 | Balakrishnan | H04W 84/18 370/328 |

(Continued)

FOREIGN PATENT DOCUMENTS

| CN | 1367443 A | 9/2002 |
| CN | 1720489 A | 1/2006 |

(Continued)

OTHER PUBLICATIONS

International Search Report issued Jul. 31, 2012, in PCT/JP2012/066201, filed Jun. 26, 2012.

*Primary Examiner* — Aleksandr Kerzhner
*Assistant Examiner* — Eddy Cheung
(74) *Attorney, Agent, or Firm* — Oblon, McClelland, Maier & Neustadt, L.L.P.

(57) ABSTRACT

Provided are a group selector 431 configured to select collection groups from multiple subgroups obtained by dividing a memory area in a first storage unit 411b; a collection group assigner 432 configured to assign the selected collection groups to data collection apparatuses 41 to 43 in order to distribute load of data collection; and a schedule generator 433 configured to generate a schedule for reading the data from the first storage unit 411b. Each of the data collection apparatuses 42, 43 includes a schedule generator 443 configured to generate a schedule for reading the data from the first storage unit 411b on the basis of a collection cycle and the number of collection groups assigned to the data collection apparatus 42.

8 Claims, 10 Drawing Sheets

(51) Int. Cl.
*G06Q 10/06* (2012.01)
*G05B 15/02* (2006.01)
*H04Q 9/00* (2006.01)

(52) U.S. Cl.
CPC ......... *G06Q 10/06311* (2013.01); *H04Q 9/00* (2013.01); *G05B 2219/37532* (2013.01); *G05B 2219/37533* (2013.01); *H04Q 2209/10* (2013.01); *H04Q 2209/30* (2013.01); *Y02P 90/10* (2015.11); *Y02P 90/20* (2015.11)

(56) References Cited

U.S. PATENT DOCUMENTS

| | | | | |
|---|---|---|---|---|
| 2002/0030604 | A1* | 3/2002 | Chance | H04Q 9/00 340/870.09 |
| 2004/0066746 | A1* | 4/2004 | Matsunaga | H04L 47/10 370/235 |
| 2005/0033458 | A1* | 2/2005 | Brindac | G05B 15/02 700/19 |
| 2005/0240540 | A1* | 10/2005 | Borleske | G01D 4/004 705/401 |
| 2006/0079966 | A1* | 4/2006 | Ashida | G05B 19/0421 700/14 |
| 2009/0132851 | A1* | 5/2009 | Pruthi | G06F 11/1076 714/6.12 |
| 2011/0074598 | A1* | 3/2011 | Cornwall | G01D 4/004 340/870.01 |

FOREIGN PATENT DOCUMENTS

| | | |
|---|---|---|
| CN | 1952824 A | 4/2007 |
| CN | 102205925 A | 10/2011 |
| JP | 6-209493 | 7/1994 |
| JP | 10-69498 | 3/1998 |
| JP | 2001-5516 | 1/2001 |
| JP | 2002-163180 | 6/2002 |
| JP | 2004-274201 | 9/2004 |
| JP | 2009-205486 | 9/2009 |
| JP | 2009-251874 | 10/2009 |
| JP | 2010-271850 | 12/2010 |
| JP | 2011-237929 | 11/2011 |
| JP | 2012-18438 | 1/2012 |
| WO | 2012/004954 A1 | 1/2012 |

\* cited by examiner

FIG. 4
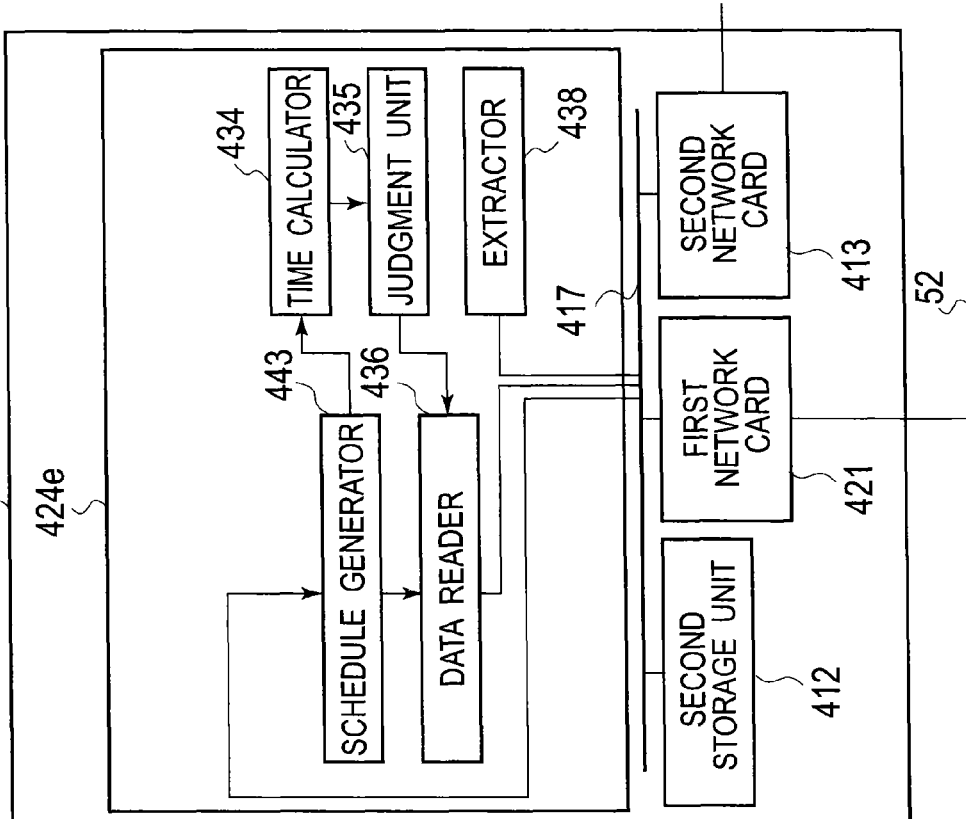
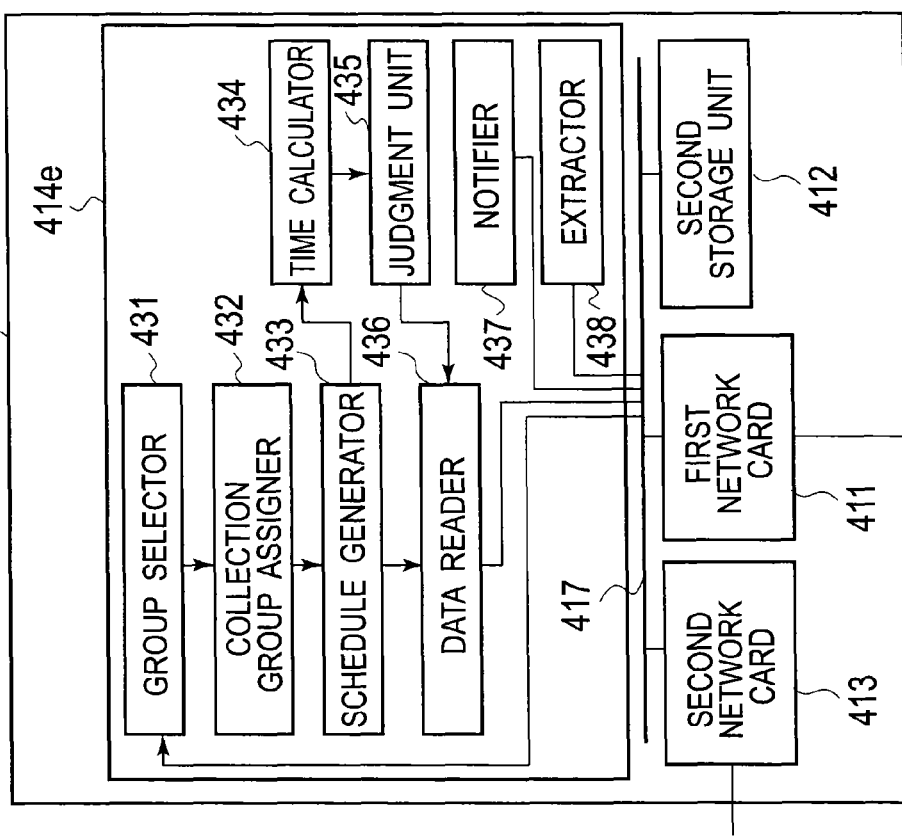

FIG. 8

| TIME | 1 | 2 | 3 | 4 | 5 | 6 | 7 | 8 | 9 | 10 | 11 | 12 | 13 |
|---|---|---|---|---|---|---|---|---|---|---|---|---|---|
| HIGH SPEED | 7 | 7 | 7 | 7 | 7 | 7 | 7 | 7 | 7 | 7 | 7 | 7 | 7 |
| MIDDLE SPEED | 3 | 3 | 3 | 3 | 3 | 2 | 2 | 2 | 2 | 2 | 2 | 2 | 2 |
| LOW SPEED | 1 | 1 | 1 | 1 | 1 | 1 | 1 | 1 | 1 | 1 | 1 | 1 | 1 |

| TIME | 14 | 15 | 16 | 17 | 18 | 19 | 20 | 21 | 22 | 23 | 24 | 25 | 26 |
|---|---|---|---|---|---|---|---|---|---|---|---|---|---|
| HIGH SPEED | 7 | 7 | 7 | 7 | 7 | 7 | 7 | 7 | 7 | 7 | 7 | 7 | 7 |
| MIDDLE SPEED | 2 | 2 | 2 | 2 | 2 | 2 | 2 | 2 | 2 | 2 | 2 | 2 | 3 |
| LOW SPEED | 1 | 1 | 1 | 1 | 1 | 1 | 1 | 1 | 1 | 1 | 1 | 1 | 1 |

| TIME | 40 | 41 | 42 | 43 | 44 | 45 | 46 | 47 | 48 | 49 | 50 | 51 | 52 |
|---|---|---|---|---|---|---|---|---|---|---|---|---|---|
| HIGH SPEED | 7 | 7 | 7 | 7 | 7 | 7 | 7 | 7 | 7 | 7 | 7 | 7 | 7 |
| MIDDLE SPEED | 2 | 2 | 2 | 2 | 2 | 2 | 2 | 2 | 2 | 2 | 2 | 2 | 2 |
| LOW SPEED | 1 | 0 | 0 | 0 | 0 | 0 | 0 | 0 | 0 | 0 | 0 | 0 | 0 |

| TIME | 196 | 197 | 198 | 199 | 200 | 201 | 202 | 203 | 204 | 205 | 206 | 207 | 208 |
|---|---|---|---|---|---|---|---|---|---|---|---|---|---|
| HIGH SPEED | 7 | 7 | 7 | 7 | 7 | 7 | 7 | 7 | 7 | 7 | 7 | 7 | 7 |
| MIDDLE SPEED | 2 | 2 | 2 | 2 | 2 | 2 | 2 | 2 | 2 | 2 | 2 | 2 | 2 |
| LOW SPEED | 0 | 0 | 0 | 0 | 0 | 1 | 1 | 1 | 1 | 1 | 1 | 1 | 1 |

DATA COLLECTION SYSTEM AND DATA COLLECTION SYSTEM PROGRAM

TECHNICAL FIELD

The present invention relates to a data collection system, and a data collection system program, for collecting data from control apparatuses which are widely used to control industrial systems such as: an FA sector including iron and steel plants, paper mill plants, and assembly operations in the automobile industry and the like; a PA sector including chemical plants; and water supply and sewage systems as well as other utility systems.

BACKGROUND ART

Among generally-used control systems for controlling control objects such as plant equipment, there is a control system which is formed from multiple control apparatuses connected together via a network and controls the plant equipment by transferring control information among the control apparatuses via the network.

There is another control system which monitors the plant equipment by collecting data, such as process values, from the control apparatuses via the network.

There has been an idea that: a control system stores data on control of the plant equipment; and, for example, when an abnormal condition occurs in the plant equipment, the stored data are analyzed for use to examine causes of the occurrence of the abnormal condition, and to make plans about how to deal with the abnormal condition.

Patent Document 1 has proposed a data collection apparatus for an iron and steel plant system which is configured to: collect binary data of control information outputted from a control apparatus to an iron and steel plant; collect binary data of event information on the iron and steel plant controlled by use of the control information outputted from the control apparatus; add a common key to the binary data of the control information and the binary data of the event information which are collected at the same time; accumulate the binary data of the control information together with the attached common keys; and accumulate the binary data of the event information together with the attached common keys.

PRIOR ART DOCUMENT

Patent Document

Patent Document 1: Japanese Patent Application Publication No. 2010-271850

SUMMARY OF INVENTION

Problem to be Solved by Invention

In the case of a large-scale plant such as an iron and steel plant or a paper mill plant, however, it is likely that the number of data to be store reaches tens of thousands.

In such a case, the configuration including only one data collection apparatus as described in Patent Document 1 is likely to fail to complete collecting targeted data within a data collection period because of its insufficient data collection capacity. Against the background, there has been an idea that multiple data collection apparatuses are provided in a network and collect data in a distributed manner.

However, in a case where the multiple data transfer apparatuses collect small pieces of divided data in a distributed manner, the data transfer processing rate decreases in some cases depending on the data transfer rate characteristic.

The present invention has been carried out with the foregoing problem taken into consideration. The present invention aims at providing a data collection system, and a data collection system program, for collecting data without decreasing the data transfer processing rate even though multiple data transfer apparatuses perform distributed data collection.

Means for Solving the Problems

For the purpose of achieving the foregoing object, a first feature of a data collection system of the present invention is that the data collection system includes a data collection apparatus and a master data collection apparatus which are connected to a control apparatus via a network. Here, the master data collection apparatus includes: a master scan data storage unit configured to store data which are transmitted among the control apparatus, the data collection apparatus and the master data collection apparatus by scan transmission; a group selector configured to divide a memory area in the master scan data storage unit into multiple groups, to further divide a memory area in each group into multiple subgroups, and to select at least one of the divided subgroups as a collection group, which is a unit to continuously read data in the group, in order to avoid decrease in a read speed of the data, on the basis of a data transfer rate characteristic corresponding to a size of the data; a collection group assigner configured to assign multiple collection groups selected by the group selector to the data collection apparatus and the master data collection apparatus in order to distribute load of collection of the data between the data collection apparatus and the master data collection apparatus; a master schedule generator configured to generate a schedule for reading the data from the master scan data storage unit per unit time, on the basis of a collection cycle for collecting the data and the number of collection groups assigned to the master data collection apparatus by the collection group assigner; a master data reader configured to read the data from the master scan data storage unit on the basis of the schedule generated by the master schedule generator; and a master data storage unit configured to store the data read by the master data reader. Meanwhile, the data collection apparatus comprises: a scan data storage unit configured to store the data which are transmitted among the control apparatus, the data collection apparatus and the master data collection apparatus by scan transmission;

a schedule generator configured to generate a schedule for reading the data from the scan data storage unit per unit time, on the basis of the collection cycle for collecting the data and the number of collection groups assigned to the data collection apparatus by the collection group assigner; a data reader configured to read the data from the scan data storage unit on the basis of the schedule generated by the schedule generator; and a data storage unit configured to store the data read by the data reader.

A second feature of the data collection system of the present invention is that the data collection system further includes: a location information requesting unit configured to request the master data collection apparatus to send location information on the data collection apparatus in which the data are stored; a data requesting unit configured to request the data collection apparatus indicated by the location information to send the data on the basis of the location information which is sent from the master data collection apparatus as a response to the request from the location information requesting unit; and a display control unit configured to cause a display unit to display the data which are sent as a response of the data collection apparatus to the request from the data requesting unit. Here, the master data collection apparatus further comprises a notifier configured to notify the monitoring apparatus of the data collection apparatus to which the collection groups including the data are assigned, as the location information on the data, when the monitoring apparatus requests the master data collection apparatus to send the location information on the data, and the data collection apparatus further comprises an extractor configured to extract the requested data from the data storage unit, and to send the read data to the monitoring apparatus, when the monitoring apparatus requests the data collection apparatus to send the data.

For the purpose of achieving the foregoing object, a first feature of a data collection program of the present invention is that the data collection program is to be executed by a data collection system including a data collection apparatus and a master data collection apparatus which are connected to a control apparatus via a network. Here, the data collection program causes the master data collection apparatus to perform: a master scan data storing step of causing a master scan data storage unit to store data which are transmitted among the control apparatus, the data collection apparatus and the master data collection apparatus by scan transmission; a group selecting step of dividing a memory area in the master scan data storage unit into multiple groups, further dividing a memory area in each group into multiple subgroups, and selecting at least one of the divided subgroups as a collection group, which is a unit to continuously read data in the group, in order to avoid decrease in a readout speed of the data, on the basis of a data transfer rate characteristic corresponding to a size of the data; a collection group assigning step of assigning multiple collection groups selected in the group selecting step to the data collection apparatus and the master data collection apparatus in order to distribute load of collection of the data between the data collection apparatus and the master data collection apparatus; a master schedule generating step of generating a schedule for reading the data from the master scan data storage unit per unit time, on the basis of a collection cycle for collecting the data and the number of collection groups assigned to the master data collection apparatus in the collection group assigning step; a master data reading step of reading the data from the master scan data storage unit on the basis of the schedule generated in the master schedule generating step; and a master data storing step of causing a master data storage unit to store the data read in the master data reading step. Meanwhile, the data collection program causes the data collection apparatus to perform: a scan data storing step of causing a scan data storage unit to store the data which are transmitted among the control apparatus, the data collection apparatus and the master data collection apparatus by scan transmission; a schedule generating step of generating a schedule for reading the data from the scan data storage unit per unit time, on the basis of the collection cycle for collecting the data and the number of collection groups assigned to the data collection apparatus in the collection group assigning step; a data reading step of reading the data from the scan data storage unit on the basis of the schedule generated in the schedule generating step; and a storing step of causing a data storage unit to store the data read in the data reading step.

A second feature of the data collection program of the present invention is that the data collection system further comprises a monitoring apparatus, and that the data collection program causes the monitoring apparatus to perform: a location information requesting step of requesting the master data collection apparatus to send location information on the data collection apparatus in which the data are stored; a data requesting step of requesting the data collection apparatus indicated by the location information to send the data on the basis of the location information which is sent from the master data collection apparatus as a response to the request in the location information requesting step; and a display controlling step of causing a display unit to display the data which are sent as a response of the data collection apparatus to the request in the data requesting step. Meanwhile, the data collection program causes the master data collection apparatus to further perform a notifying step of notifying the monitoring apparatus of the data collection apparatus to which the collection groups including the data are assigned, as the location information on the data, when the monitoring apparatus requests the master data collection apparatus to send the location information on the data. Moreover, the data collection program causes the data collection apparatus to further perform an extracting step of extracting the requested data from the data storage unit, and sending the read data to the monitoring apparatus, when the monitoring apparatus requests the data collection apparatus to send the data.

Effects of Invention

The data collection system and the data collection system program of the present invention collect the data without decreasing the data transfer processing rate even though the multiple data transfer apparatuses collect the data in a distributed manner.

BRIEF DESCRIPTION OF DRAWINGS

FIG. 4 is a detailed diagram showing the configurations, respectively, of two of the data collection apparatuses included in the data collection system of the first embodiment of the present invention.

FIG. 8 is a diagram showing examples of a schedule generated by a schedule generator included in the data collection apparatus in the data collection system of the first embodiment of the present invention.

MODES FOR CARRYING OUT THE INVENTION

Figure 1:
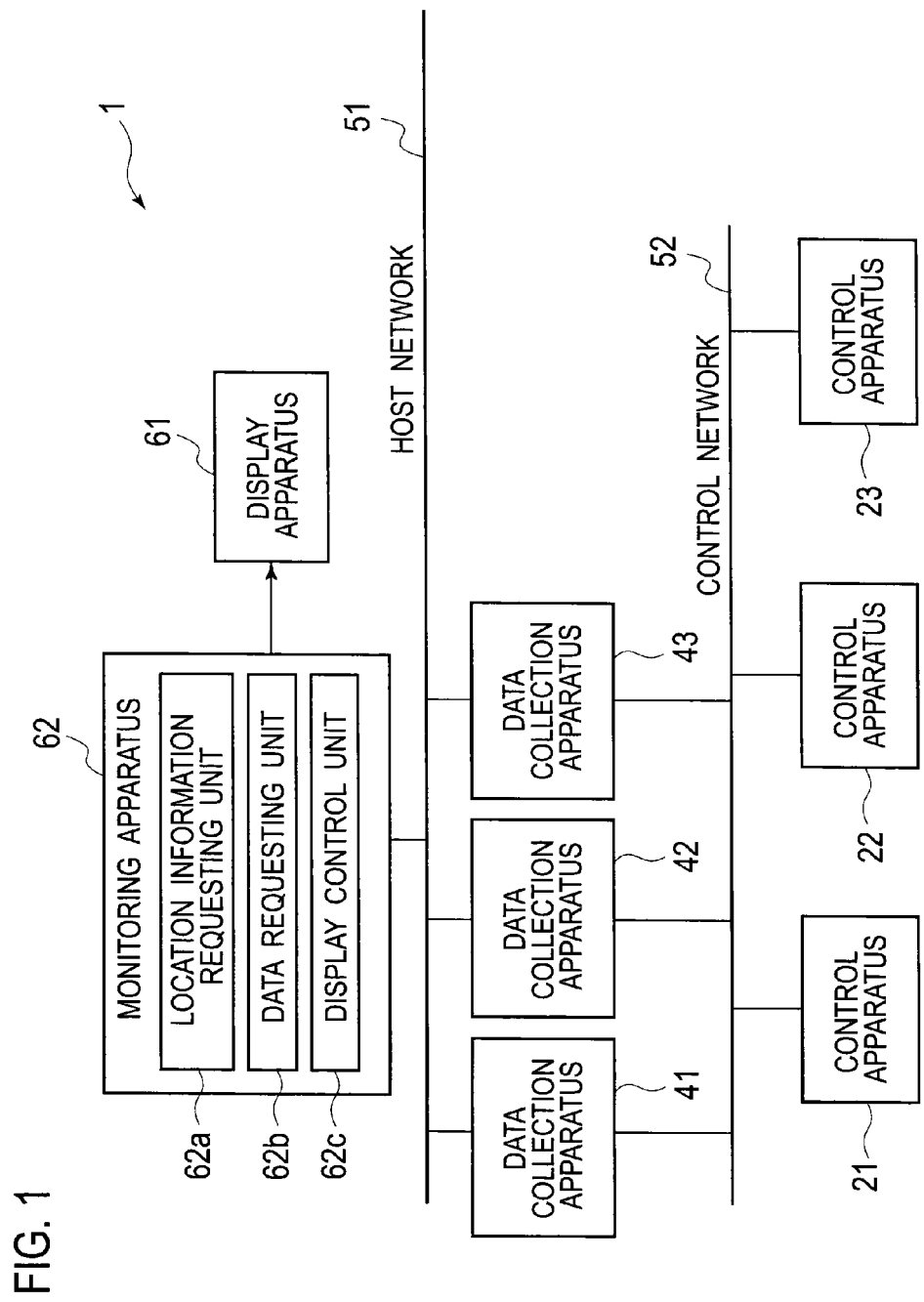
FIG. 1 is a diagram showing connecting relationships in a data collection system of a first embodiment of the present invention.

Referring to the drawings, descriptions will be hereinbelow provided for the best mode for carrying out the invention.

First Embodiment

FIG. 1 is a diagram showing connecting relationships in a data collection system of a first embodiment of the present invention.

As shown in FIG. 1, a data collection system 1 of the first embodiment of the present invention includes control apparatuses 21, 22 and data collection apparatuses 41 to 43, which are connected together via a control network 52. The data collection system 1 further includes a monitoring apparatus 62, which is connected to the data collection apparatuses 41 to 43 via a host network 51.

Each of the control apparatuses 21, 22 is formed from a control controller whose typical example is a PLC (Programmable Logic Controller).

Each of the data collection apparatuses 41 to 43 is a computer apparatus configured to collect data supplied from the control apparatuses 21, 22. In this respect, when it comes down to controlling the plant equipment in a hot rolling plant, for instance, the term "data" means various types of data on plant control equipment needed to operate the hot rolling plant, and examples of the data include production instruction data, production result data, alarm data, roll data, model calculation data, model learning data, invariable data and parameter data.

Furthermore, the data collection apparatuses 41 to 43 and the control apparatuses 21, 22 connected to the control network include their respective common memories. The common memories collectively play a function as a network apparatus by scan transmission (cyclic transmission) which transmits control data among the apparatuses.

To this end, each common memory is provided with transmission data areas and reception data areas assigned to the apparatuses. Thereby, data in the transmission data area in the control apparatus 21, for example, are transferred to the common memories in all of the other apparatuses connected to the control network 52 by one round of data transmission. Descriptions will be provided later for the concept of the scan transmission among the common memories.

A display apparatus 61 includes an image output unit such as an organic EL (electroluminescence) display or a liquid crystal display, and is connected to the monitoring apparatus 62. The display apparatus 61 displays graphs and the like on the basis of output signals supplied from the monitoring apparatus 62.

On the basis of process data supplied from the data collection apparatuses 41 to 43, the monitoring apparatus 62 causes the display apparatus 61 to display multiple data with their time axes aligned with each other.

In addition, the monitoring apparatus 62 includes a location information requesting unit 62a, a data requesting unit 62b and a display control unit 62c in light of its functions.

The location information requesting unit 62a requests the data collection apparatus 41, which serves as a master data collection apparatus, to send location information on the data collection apparatuses 41 to 43 in which data are stored. In this respect, the master data collection apparatus is one of the data collection apparatuses, and is a computer apparatus having a function to collect data supplied from the control apparatuses 21, 22 and to distribute load of data collection among the data collection apparatuses 41 to 43.

On the basis of the location information sent from the data collection apparatus 41 as a response to the request from the location information requesting unit 62a, the data requesting unit 62b requests the data collection apparatuses 41 to 43, which are indicated in the location information, to send their data.

The display control unit 62c causes the display apparatus 61 to display the data which are sent as responses from the data collection apparatuses 41 to 43 to the request from the data requesting unit 62b.

Figure 2:
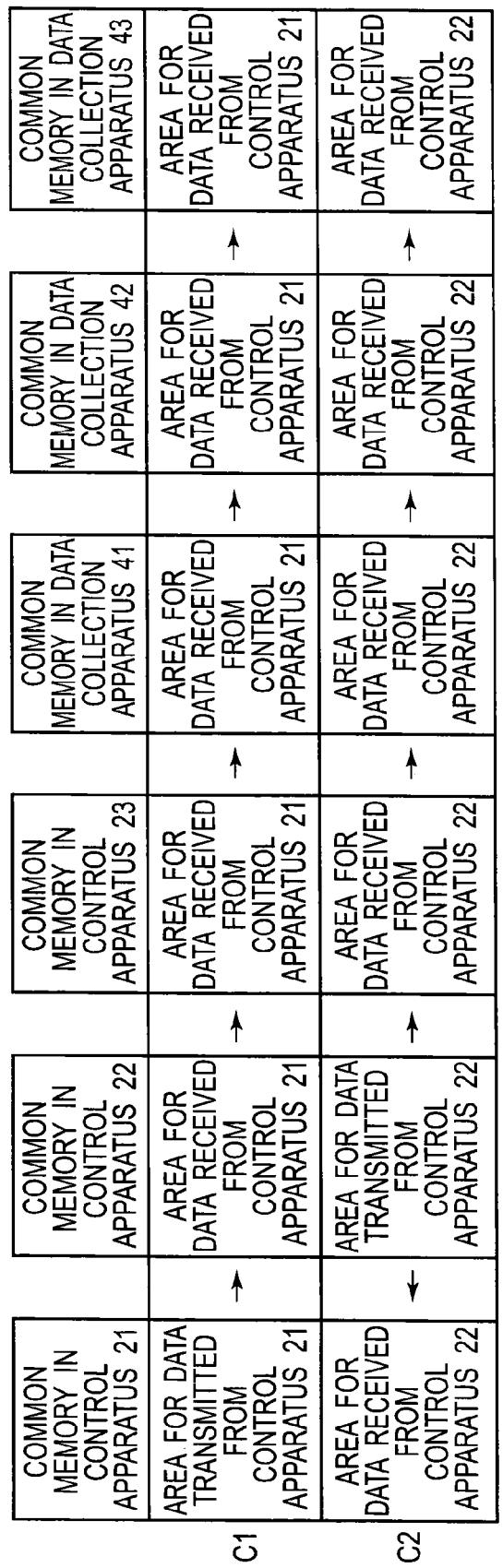
FIG. 2 is a diagram schematically showing a concept of a scan transmission among common memories included, respectively, in control apparatuses and data collection apparatuses in the data collection system of the first embodiment of the present invention.

FIG. 2 is a diagram schematically showing the concept of the scan transmission among the common memories included, respectively, in the control apparatuses 21, 22 and the data collection apparatuses 41 to 43 in the data collection system 1 of the first embodiment of the present invention.

As shown in the line C1 in FIG. 2, for each control cycle, data in the transmission data area in the control apparatus 21 are transferred to the common memories in all of the other apparatuses (the control apparatuses 22, 23 and the data collection apparatuses 41 to 43) connected to the same transmission line in one round of the data transmission. As shown in the line C2, for each control cycle, data in a transmission data area in the control apparatus 22 are similarly transferred to the common memories in all of the other apparatuses (the control apparatuses 21, 23 and the data collection apparatuses 41 to 43).

As described above, each common memory is provided with the transmission data area assigned to the apparatus of its own, and the transmission data areas assigned respectively to the other apparatuses; and data are sent to the common memories in all of the other apparatuses by scan transmission. For this reason, all the apparatuses can share the same data.

Figure 3:
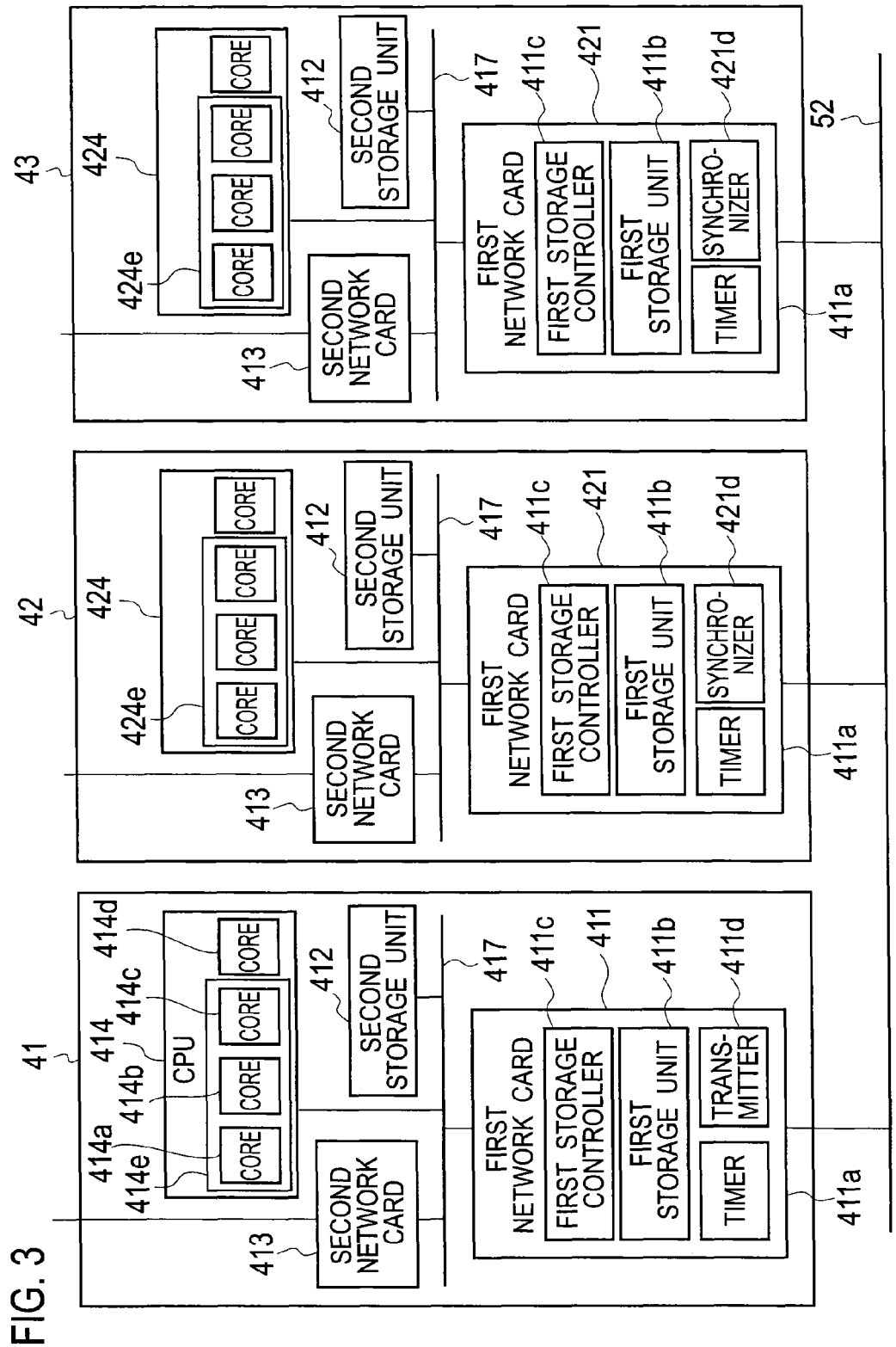
FIG. 3 is a diagram showing configurations of respective data collection apparatuses included in the data collection system of the first embodiment of the present invention.

FIG. 3 is a diagram showing configurations of the respective data collection apparatuses 41 to 43 included in the data collection system 1 of the first embodiment of the present invention.

As shown in FIG. 3, the data collection system 1 includes the data collection apparatuses 41 to 43 connected together via the control network 52.

The data collection apparatus 41 (the master data collection apparatus) includes a first network card 411, a second storage unit 412, a second network card 413 and a CPU 414, which are connected together via a bus 417.

The first network card 411 is an interface card for connecting to the control network 52. The first network card 411 includes: a self-operating timer 411a for measuring time; a first storage unit 411b; a first storage controller 411c; and a transmitter 411d.

The first storage unit 411b is one of the above-described common memories, and stores data supplied from the control apparatuses 21, 22.

Once data in the transmission data area in the first storage unit 411b is rewritten with new data, the first storage controller 411c sends the new data to the other apparatuses by scan transmission. In addition, upon reception of new data by scan transmission, the first storage controller 411c rewrites old data in the reception data area in the first storage unit 411b.

The transmitter 411d multicasts the time measured by the timer 411a in the data collection apparatus 41, which is the apparatus of its own, on the control network 52 at predetermined intervals of, for example, 10 milliseconds.

The second storage unit 412 associates the time measured by the timer 411a with the data stored in the first storage unit 411b, and stores the time and the data thus associated as process data. In addition, the second storage unit 412 stores a predetermined collection group pattern on the basis of a transfer rate characteristic corresponding to the data size.

The second network card 413 is an interface card for connecting to the host network 51.

The CPU 414 centrally controls the data collection apparatus 41. In addition, the CPU 414 includes four microprocessor cores 414a to 414d.

Of the microprocessor cores 414a to 414d, the microprocessor core 414d is dedicated to perform judgment processing to judge whether or not a sampling cycle has been reached (or, a unit time has passed) on the basis of the time measured by the timer 411a. The judgment processing is set to be assigned to only the microprocessor core 414d by use of an API (Application Program Interface) or the like equipped in the OS (Operating System). In this respect, the sampling cycle is set in advance at 1 millisecond, for example.

Thereby, even if the CPU 414 operates under heavy load, the microprocessor core 414d is dedicated to perform the judgment processing and therefore can accurately judge whether or not the sampling cycle has been reached.

In the meantime, the microprocessor cores 414a to 414c (hereinafter collectively referred to as a CPU core 414e) perform various processing to be described later. In addition, the CPU core 414e reads the data stored in the first storage unit 411b at a time when the microprocessor core 414d judges the sampling cycle has been reached.

Like the data collection apparatus 41, each of the data collection apparatuses 42, 43 includes the second storage unit 412 and the second network card 413, which are connected together via the bus 417.

Each of the data collection apparatuses 42, 43 includes a CPU 424 instead of the CPU 414. Detailed descriptions will be provided later for the CPU 414 and the CPU 424.

Each of the data collection apparatuses 42, 43 further includes a first network card 421 instead of the first network card 411.

The first network card 421 is an interface card for connecting to the control network 52. The first network card 421 includes: a self-operating timer 411a for measuring time; a first storage unit 411b; a first storage controller 411c; and a synchronizer 421d. As for their configurations, the timer 411a, the first storage unit 411b and the first storage controller 411c have the same configurations as those in the first network card 411 which are denoted by the same reference signs. For this reason, descriptions for them will be omitted.

The synchronizer 421d adjusts the timer 411a included in the apparatus of its own on the basis of the time sent from the data collection apparatus 41, which is the master data collection apparatus, via the control network 52.

Thereby, the time of the timer 411a included in each of the data collection apparatuses 42, 43 can be adjusted at the time of the timer 411a included in the data collection apparatus 41. This makes it possible to provide the multiple data collection apparatuses on the control network 52, and to synchronize all the data collection apparatuses in time.

FIG. 4 is a detailed diagram showing the configuration of the data collection apparatus 41 included in the data collection system 1 of the first embodiment of the present invention.

As described above, the data collection apparatus 41 includes the first network card 411, the second storage unit 412, the second network card 413 and the CPU 414, which are connected together via the bus 417.

The CPU core 414e is included in the CPU 414, and centrally controls the data collection apparatus 41. In addition, the CPU core 414e includes a group selector 431, a collection group assigner 432, a schedule generator 433, a time calculator 434, a judgment unit 435, a data reader 436, a notifier 437 and an extractor 438 in light of its functions.

The group selector 431 divides the memory area in the first storage unit 411b into multiple groups, and divides the memory area in each group into multiple subgroups.

Figure 5:
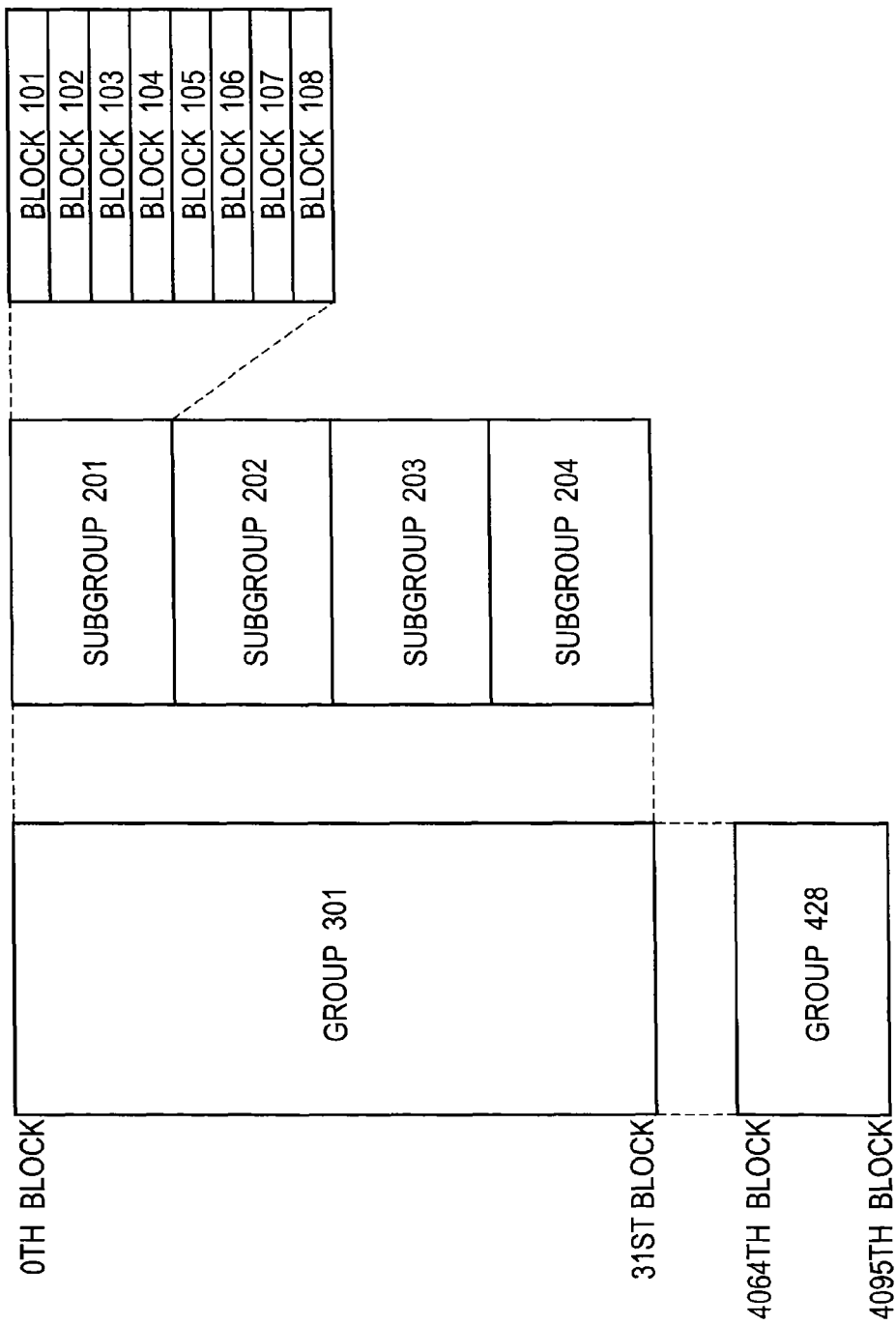
FIG. 5 is a diagram showing a memory area in a first storage unit included in one of the data collection apparatuses in the data collection system of the first embodiment of the present invention.

FIG. 5 is a diagram showing the memory area in the first storage unit 411b included in the data collection apparatus 41 in the data collection system 1 of the first embodiment of the present invention.

As shown in FIG. 5, the group selector 431 divides the memory area in a way that: beginning at the top of the memory area in the first storage unit 411b, each collection of 128 bytes is treated as one block; and 8 blocks, such as blocks 101 to 108, are treated as one subgroup.

Furthermore, the group selector 431 treats four subgroups, for example subgroups 201 to 204, as a group 301.

Since the group selector 431 thus divides the memory area hierarchically, data stored in the memory area can be read efficiently when the reading is performed on a subgroup-to-subgroup basis as will be described later.

Moreover, on the basis of the data transfer rate characteristic corresponding to the data size, the group selector 431 selects one or more divided subgroups as a collection group, which is a unit to continuously read data in a group, in order to avoid decrease in the data readout speed. In this respect, the data size tends to affect the data transfer rate to a large extent, depending on the telecommunications standard, the network setting, or the like. For example, the use of the DMA method in data transfer enables high-speed transfer of data in large quantities. However, in the case of transferring a small quantity of data stored in a distributed manner in the storage unit, the data may be transferred faster if the data transfer is carried out without using the DMA method. As described above, the data transfer rate characteristic may vary depending on the transferred data size. With this taken into consideration, the group selector 431 selects the collection group, which is the unit for the continuous reading, in order to avoid decrease in the data readout speed, namely, the speed to read from the first storage unit 411b.

The collection group assigner 432 assigns collection groups, selected by the group selector 431, to the data collection apparatuses 41 to 43 in order to distribute load of data collection among the data collection apparatuses 41 to 43.

The schedule generator 433 generates a schedule for reading data from the first storage unit 411b per unit time on the basis of: the number of subgroups selected as the collection group assigned to the data collection apparatus 41 by the collection group assigner 432; and a collection cycle for the data collection.

The time calculator 434 calculates an amount of time it takes to read the data per unit time, as a needed readout time, on the basis of the schedule generated by the schedule generator 433. To put it specifically, the time calculator 434 calculates, as the needed readout time, a value obtained by multiplying the data transfer rate by the number of collection groups per unit time in accordance with the schedule generated by the schedule generator 433.

On the basis of the needed readout time calculated by the time calculator 434, the judgment unit 435 judges whether or not the data readout will be able to be completed within the unit time. To put it specifically, if the needed readout time calculated by the time calculator 434 is equal to or greater than a threshold length of time obtained by subtracting a predetermined time allowance from the unit time, the judgment unit 435 judges that the data readout will be unable to be completed within the unit time, and issues a warning.

If the judgment unit 435 judges that the data readout will be able to be completed within the unit time, the data reader 436 reads the data from the first storage unit 441b.

When the monitoring apparatus 62 requests the notifier 437 to send the location information on the data, the notifier 437 notifies the monitoring apparatus 62 of one of the data collection apparatuses 41 to 43, to which the collection group including the data are assigned, as the location information on the data.

When the monitoring apparatus 62 requests the extractor 438 to send the data, the extractor 438 extracts the requested data from the first storage unit 411b, and sends the read data to the monitoring apparatus 62.

The data collection apparatus 42 includes the first network card 421, the second storage unit 412, the second network card 413 and the CPU 424, which are connected together via the bus 417.

A CPU core 424e is included in the CPU 424, and centrally controls the data collection apparatus 41. In addition, the CPU core 424e includes a schedule generator 443, the time calculator 434, the judgment unit 435, the data reader 436 and the extractor 438 in light of its functions. As for their configurations, the configurations other than that of the schedule generator 443 are the same configurations as those included in the data apparatus 41 which are denoted by the same reference signs. For this reason, descriptions for them will be omitted.

The schedule generator 443 generates a schedule for reading data from the first storage unit 411b per unit time on the basis of: the number of collection groups assigned to the data collection apparatus 42 by the collection group assigner 432 in the data collection apparatus 41; and the collection cycle for the data collection.

Figure 6:
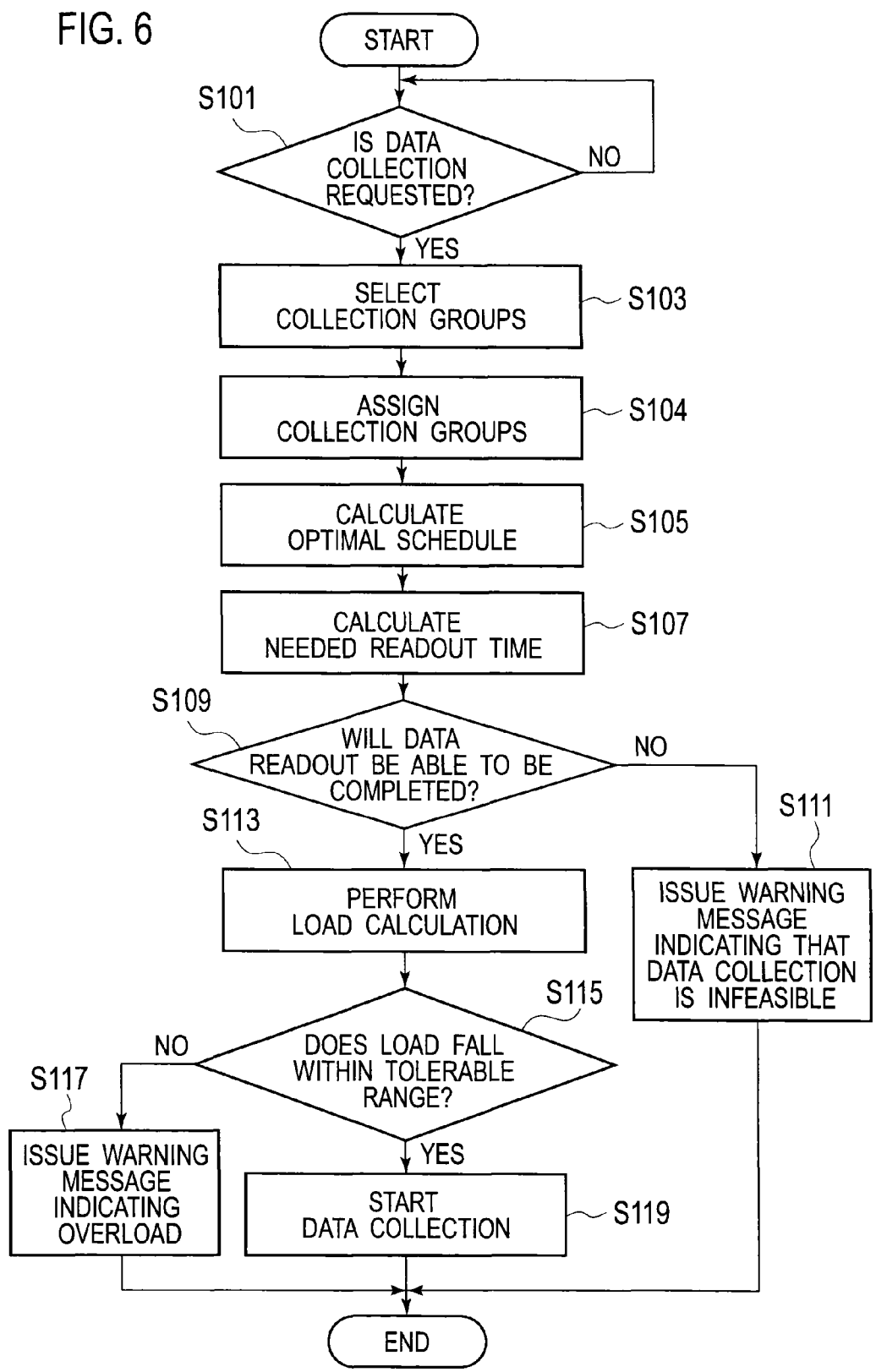
FIG. 6 is a flowchart showing procedures of processing to be performed by a data collection apparatus serving as a master data collection apparatus included in the data collection system of the first embodiment of the present invention.

FIG. 6 is a flowchart showing procedures of processing to be performed by the data collection apparatus 41 serving as the master data collection apparatus, and included in the data collection system 1 of the first embodiment of the present invention.

As shown in FIG. 6, once the data collection is requested (step S101), the group selector 431 in the CPU 414 selects the collection group (step S103). To put it specifically, the group selector 431 divides the memory area in the first storage unit 411b into multiple groups, and further divides the memory area in each group into multiple subgroups. Subsequently, on the basis of the transfer rate characteristic corresponding to the data size, the group selector 431 selects one or more divided subgroups, as the collection group which is the unit to continuously read the data in the group, in order to avoid decrease in the data readout speed.

Figure 7:
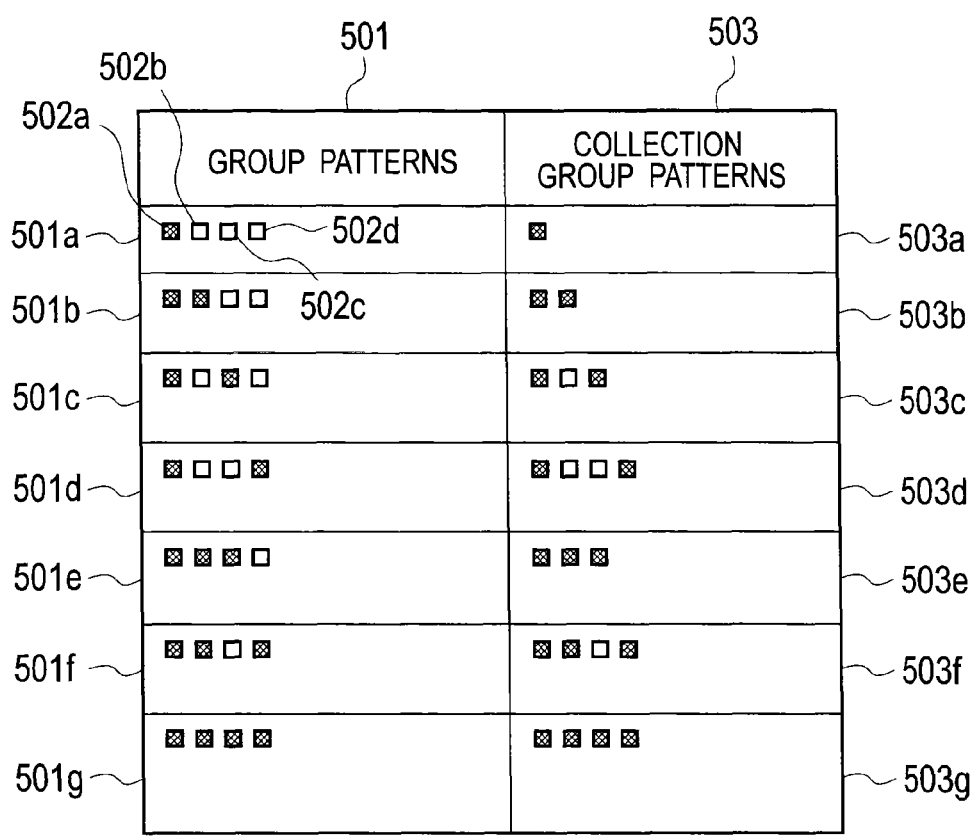
FIG. 7 is a diagram for explaining collection group patterns to be selected by a group selector included in the data collection apparatus in the data collection system of the first embodiment of the present invention.

FIG. 7 is a diagram for explaining patterns of the collection group to be selected by the group selector 431 included in the data collection apparatus 41 in the data collection system 1 of the first embodiment of the present invention.

The patterns of the collection group are predetermined on the basis of the transfer rate characteristics corresponding to the respective data sizes, and are stored in the second storage unit 412 as the collection group patterns.

The group selector 431 selects the collection group on the basis of the corresponding collection group pattern stored in the second storage unit 412.

As shown in FIG. 7, each group pattern 501 indicates a pattern of the subgroup arrangement. "■" denotes a subgroup where data are registered in the first storage unit 411b, and "□" denotes a subgroup where no data are registered in the first storage unit 411b.

For example, a group pattern 501a is indicated with "■ □ □ □." This means that data are registered in a subgroup 502a at the top while no data are registered in subgroups 502b to 502d.

In the case of the group pattern 501a, a collection group pattern 503a is indicated as "■."

This shows that, judging from the transfer rate characteristic, the transfer rate, namely the readout speed is faster when only the subgroup 502a is read than when all the subgroups 502a to 502d are read.

A group pattern 501b is indicated with "■0 ■ □ □." This means that data are registered in the subgroups 502a, 502b at the top while no data are registered in the subgroups 502c, 502d.

In the case of the group pattern 501b, a collection group pattern 503b is indicated as "■ ■."

This shows that, judging from the transfer rate characteristic, the transfer rate, namely the readout speed is faster when only the subgroups 502a, 502b are read than when all the subgroups 502a to 502d are read.

A group pattern 501c is indicated with "■ □ ■□." This means that data are registered in the subgroups 502a, 502c while no data are registered in the subgroups 502b, 502c.

In the case of the group pattern 501c, a collection group pattern 503c is indicated as "■□ ■."

This shows that, judging from the transfer rate characteristic, the transfer rate, namely the readout speed is faster when only the subgroups 502a to 502c, which include the subgroup 502b intervening between the subgroups 502a, 502c, are read than when the subgroups 502a, 502c are read one by one.

A group pattern 501d is indicated with "■ □ □ ■." This means that data are registered in the subgroups 502a, 502d while no data are registered in the subgroups 502b, 502c.

In the case of the group pattern 501d, a collection group pattern 503d is indicated as "■ □ □ ■."

This shows that, judging from the transfer rate characteristic, the transfer rate, namely the readout speed is faster when only the subgroups 502a to 502d, which include the subgroups 502b, 502c intervening between the subgroups 502a, 502d, are read than when the subgroups 502a, 502d are read one by one.

A group pattern 501e is indicated with "■ ■ ■ □." This means that data are registered in the subgroups 502a to 502C at the top while no data are registered in the subgroup 502d.

In the case of the group pattern 501e, a collection group pattern 503e is indicated as "■ ■ ■."

This shows that, judging from the transfer rate characteristic, the transfer rate, namely the readout speed is faster when only the subgroups 502a to 502c are read than when all the subgroups 502a to 502d are read.

A group pattern 501f is indicated with "■ ■ □ ■." This means that data are registered in the subgroups 502a, 502b, 502d while no data are registered in the subgroup 502c.

In the case of the group pattern 501f, a collection group pattern 503f is indicated as "■ ■ □ ■."

This shows that, judging from the transfer rate characteristic, the transfer rate, namely the readout speed is faster when all the subgroups 502a to 502d, which includes the subgroup 502c, are read than when the subgroups 502a, 502b, 502d are read one by one.

A group pattern 501g is indicated with "■ ■ ■ ■." This means that data are registered in all the subgroups 502a to 502d.

In the case of the group pattern 501g, a collection group pattern 503g is indicated as "■ ■ ■ ■" as a matter of course.

As described above, the collection group patterns predetermined on the basis of the transfer rate characteristics corresponding to the respective data sizes are stored in the storage unit 412. On the basis of the collection group patterns, the group selector 431 is capable of selecting the collection group. Thereby, on the basis of the data transfer rate characteristic corresponding to the data size, the group selector 431 is capable of selecting one or more divided subgroups as the collection group, which is the unit to continuously read data in the group, in order to avoid decrease in the data readout speed.

Returning to FIG. 5, the collection group assigner 432 assigns collection groups (step S104). To put it specifically, the collection group assigner 432 assigns the collection groups selected by the group selector 431 to the data collection apparatuses 41 to 43 in order to distribute load of data collection among the data collection apparatuses 41 to 43.

For example, if the number of collection groups selected by the group selector 431 is "20," "7" collection groups are assigned to the data collection apparatus 41, "7" collection groups are assigned to the data collection apparatus 42, and "6" collection groups are assigned to the data collection apparatus 43, in order that the processing load be almost equal among the data collection apparatuses 41 to 43. In addition, the collection group assigner 432 notifies the data collection apparatus 42 that the number of collection groups assigned to the data collection apparatus 42 is "7," and notifies the data collection apparatus 43 that the number of collection groups assigned to the data collection apparatus 43 is "6."

Thereafter, the schedule generator 433 in the CPU 414 calculates an optimal schedule (step S105). To put it specifically, on the basis of the collection cycle for the data collection (in this case, 1 millisecond) and the number of collection groups assigned to the data collection apparatus 41 by the collection group assigner 432, the schedule generator 433 generates a schedule for reading data from the first storage unit 411b per unit time (in this case, 1 millisecond).

For example, the schedule generator 433 determines the number of collection groups per unit time in the collection cycle, in the form of an integer value, on the basis of a value obtained by dividing the number of collection groups, assigned to the data collection apparatus 41 by the collection group assigner 432, by the collection cycle for the data collection. Thereafter, the schedule generator 433 generates the schedule by arranging the determined value for each unit time.

FIG. 8 is a diagram showing examples of the schedule to be generated by the schedule generator 433 included in the data collection apparatus 41 in the data collection system 1 of the first embodiment of the present invention. In this respect, let us assume that: there are three collection cycles for high, middle and low speeds; the collection cycle for the high-speed collection is a 1-millisecond cycle; the collection cycle for the middle-speed collection is a 25-millisecond cycle; and the collection cycle for the low-speed collection is a 200-millisecond cycle. Furthermore, in this respect, let us assume that: the number of collection groups assigned to the data collection apparatus 41 by the data group assigner 432 is "102"; the number of collection groups for the high-speed collection is "7"; the number of collection groups for the middle-speed collection is "55"; and the number of collection groups for the low-speed collection is "40."

In the case of the high-speed collection, the schedule generator 433 determines that the number of collection groups per unit time in the collection cycle is "7" in the form of an integer, since the quotient obtained by dividing the number (=7) of collection groups, assigned to the data collection apparatus 41 by the collection group assigner 432, by the collection cycle (=1) for data collection is "7."

In the corresponding example shown in FIG. 8, the schedule generator 433 sets the number of collection groups per unit time at "7" for time 1. Similarly, the schedule generator 433 sets the number of collection groups per unit time at "7" for each of the following unit times.

Furthermore, in the case of the middle-speed collection, the schedule generator 433 determines that the number of collection groups per unit time in the collection cycle is "3" or "2" in the form of an integer, because the quotient obtained by dividing the number (=55) of collection groups, assigned to the data collection apparatus 41 by the collection group assigner 432, by the collection cycle (=25) for data collection is "2.2."

For example, the schedule generator 433 determines that the numbers of collection groups per unit time are 3, 3, 3, 3, 3, 2, 2, 2, 2, 2, 2, 2, 2, 2, 2, 2, 2, 2, 2, 2, 2, 2, 2, 2 and 2 by: setting the number of collection groups at "3" for each of the first five unit times beginning at the top and at "2" for each of the following 20 unit times.

In the corresponding example shown in FIG. 8, the schedule generator 433 sets the number of collection groups per unit time at "3" for each of times 1 to 5, and at "2" for each of times 6 to 25 which are the subsequent unit times. After that, the schedule generator 433 similarly sets the number of collection groups per unit time at "3" for each of times 26 to 30, and at "2" for each of times 31 to 50 which are the subsequent unit times.

Moreover, in the case of the low-speed collection, the schedule generator 433 determines the number of collection groups per unit time in the collection cycle is "1" or "0" in the form of an integer, because the quotient obtained by dividing the number (=40) of collection groups, assigned to the data collection apparatus 41 by the collection group assigner 432, by the collection cycle (=200) for data collection is "0.2."

For example, the schedule generator 433 determines that: the number of collection groups is "1" for each of the first 40 unit times beginning at the top, and "0" for each of the following 160 unit times.

In the corresponding example shown in FIG. 8, the schedule generator 433 sets the number of collection groups per unit time at "1" for each of times 1 to 40, and at "0" for each of times 41 to 200 which are the subsequent unit times. After that, the schedule generator 433 similarly sets the number of collection groups per unit at "1" for each of times 201 to 240, and at "0" for each of times 241 to 400 which are the subsequent unit times.

In this manner, the schedule generator 433 generates the schedule for reading the data from the first storage unit 411b per unit time on the basis of the collection cycle for the data collection and the number of collection groups assigned to the data collection apparatus 41 by the collection group assigner 432.

Returning to FIG. 6, on the basis of the schedule generated by the schedule generator 433, the time calculator 434 in the CPU 414 calculates the amount of time it takes to read data per unit time, as the needed readout time (step S107). To put it specifically, the time calculator 434 calculates the needed readout time Tt corresponding to the amount of data to be transferred, by use of Equation 1 given below, where: Cg denotes the number of collection groups per unit time in the schedule generated by the schedule generator 433; and Vt denotes the data transfer rate corresponding to the amount of data to be transferred.

$$Tt = Cg \times Vt \quad \text{(Equation 1)}$$

In this respect, the data transfer rate Vt differs from one network card to another in terms of the transfer rate characteristic and the like. For this reason, the time calculator 434 measures the data transfer rate Vt for each of the numbers of collection groups by reading dummy data. For example, if the data transfer rate when 32-block (4096-byte) data are read out is 4096 bytes per 25 microseconds, the time calculator 434 sets the data transfer rate Vt at 4096 bytes per 25 microseconds when the number of collection groups is four. If the data transfer rate when 24-block (3072-byte) data are read out is 3072 bytes per 24 microseconds, the time calculator 434 sets the data transfer rate Vt at 3072 bytes per 24 microseconds when the number of collection groups is three. If the data transfer rate when 16-block (2048-byte) data are read out is 2048 bytes per 22 microseconds, the time calculator 434 sets the data transfer rate Vt at 2048 bytes per 22 microseconds when the number of collection groups is two. If the data transfer rate when 8-block (1024-byte) data are read out is 1024 bytes per 20 microseconds, the time calculator 434 sets the data transfer rate Vt at 1024 bytes per 20 microseconds when the number of collection groups is one.

In the corresponding example shown in FIG. 8, let us assume that: the number of collection groups to be read for time 1 in the case of the high-speed collection is "7"; and as for its breakdown, the number of collection groups from which to read the 4096-byte data is "3," the number of collection groups from which to read the 3072-byte data is "3," the number of collection groups from which to read the 2048-byte data is "1," and the number of collection groups from which to read the 1028 byte-data is "0." In this example, the time calculator 434 calculates that a needed readout time Th for the high-speed collection is 169 microseconds (=25×3+24×3+22×1+20×0) by use of (Equation 1).

Furthermore, in the corresponding example shown in FIG. 8, the time calculator 434 calculates that a needed readout time Tm for the middle-speed collection is 75 microseconds (=25×3) by use of (Equation 1), if the number of collection groups to be read during time 1 for the middle-speed collection is "3," and if all of the three collection groups are those for reading the 4096-byte data. What is more, in the corresponding example shown in FIG. 8, the time calculator 434 calculates that a needed readout time Tl for the low-speed collection is 25 microseconds (=25×1) by use of (Equation 1), if the number of collection groups to be read during time 1 for the low-speed collection is "1," and if all of the collection group is that for reading the 4096-byte data.

Thereafter, the time calculator 434 calculates that the needed readout time T is 269 microseconds (=169+75+25) by aggregating the needed readout times Tt (Th, Tm, Tl) which respectively correspond to the amounts of data to be transferred in the high-, middle- and low-speed collections.

Returning to FIG. 6, the judgment unit 435 in the CPU 414 subsequently judges whether or not the data readout will be able to be completed within the unit time on the basis of the needed readout time T calculated by the time calculator 434 (step S109). To put it specifically, the judgment unit 435 judges whether or not the needed readout time T calculated by the time calculator 434 is equal to or greater than a threshold length of time. In this respect, the threshold length of time Tb is defined as a length of time obtained by subtracting a given time allowance Tc from the unit time. In this case, if the unit time and the time allowance Tc are respectively 1 millisecond and 100 microseconds, the threshold length of time Tb is 900 microseconds.

In the corresponding example shown in FIG. 8, the needed readout time T at time 1 is 269 microseconds and accordingly less than 900 microseconds which is the threshold length of time Tb. For this reason, the judgment unit 435 judges that the data readout will be able to be completed within the unit time.

If it is judged in step S109 that the data readout will be unable to be completed within the unit time (if NO), the judgment unit 435 issues a warning message indicating that the data collection will be infeasible (step S111). To put it specifically, the judgment unit 435 sends the monitoring apparatus 62 a warning signal indicating the infeasibility of the data collection. The monitoring apparatus 62 causes the display apparatus 61 to display the warning message and output alarm sounds.

On the other hand, if it is judged in step S109 that the data readout will be able to be completed within the unit time (if YES), the judgment unit 435 performs load calculation (step S113). To put it specifically, the judgment unit 435 calculates a surplus capacity by subtracting the needed readout time from the threshold length of time. For example, in the corresponding example shown in FIG. 8, since the threshold length of time Tb is 900 microseconds and the needed readout time is 269 microseconds, the judgment unit 435 calculates that the surplus capacity is 631 microseconds.

Thereafter, the judgment unit 435 judges whether or not the load falls within a tolerable range (step S115). To put it specifically, if the surplus capacity calculated in step S113 takes on a positive value, the judgment unit 435 judges that the load is within the tolerable range. If the surplus capacity calculated in step S113 is equal to or less than 0 microseconds, the judgment unit 435 judges that the load exceeds the tolerable range.

If it is judged in step S115 that the load exceeds the tolerable range (if NO), the judgment unit 435 issues a warning message indicating an overload (step S117). To put it specifically, the judgment unit 435 sends the monitoring apparatus 62 a warning signal indicating the overload. The monitoring apparatus 62 causes the display apparatus 61 to display the warning message and output alarm sounds.

On the other hand, if it is judged in step S115 that the load is within the tolerable range (if YES), the data reader 436 starts the data collection (step S119). To put it specifically, the data reader 436 reads the data from the storage unit 411b on the basis of the schedule generated by the schedule generator 433, associates the read data with the time measured by the timer 411a, and causes the second storage unit 412 to store the data associated with the time as the process data.

Figure 9:
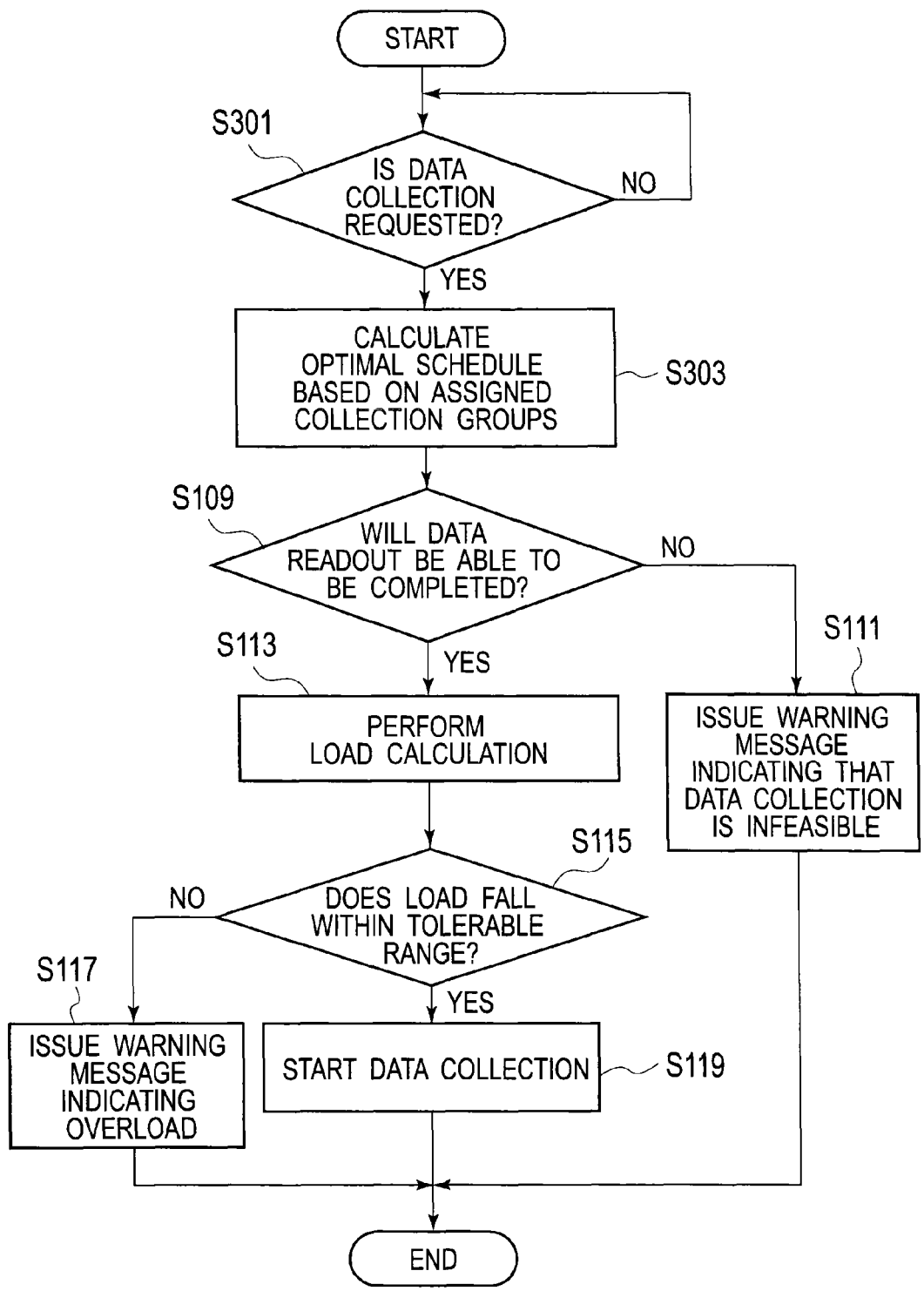
FIG. 9 is a flowchart showing procedures of processing to be performed by another data collection apparatus included in the data collection system of the first embodiment of the present invention.

FIG. 9 is a flowchart showing procedures of processing to be performed by the data collection apparatus 42 included in the data collection system 1 of the first embodiment of the present invention. It should be noted that, since the data collection apparatus 43 has the same configuration as the data collection apparatus 42, the descriptions will be provided for the data collection apparatus 42 on their behalf.

As shown in FIG. 9, once the data collection is requested (step S301), the schedule generator 443 in the CPU 414 generates a schedule for reading the data from the first storage unit 411b in the data collection apparatus 42 per unit time, on the basis of: the collection cycle for the data collection; and the number of collection groups assigned to the data collection apparatus 42 by the collection group assigner 432 in the data collection apparatus 41 (step S303).

To put it specifically, like the schedule generator 433 in the data collection apparatus 41, the schedule generator 433 generates the schedule for reading the data from the first storage unit 411b per unit time (in this case, 1 millisecond), on the basis of: the collection cycle (in this case, 1 millisecond) for the data collection; and the number of collection groups assigned to the data collection apparatus 42 by the collection group assigner 432 in the data collection apparatus 41.

The subsequent processing in steps S109 to S119 is the same as that in steps S109 to S119 in the flowchart in FIG. 6 showing the procedures of the processing to be performed by the data collection apparatus 41. For this reason, descriptions for the subsequent steps will be omitted.

As described above, the data collection system 1 of the first embodiment of the present invention is the data collection system 1 including the data collection apparatuses 42, 43 and the data collection apparatus 41 serving the master data collection apparatus, which are connected to the control apparatuses 21, 22 via the control network 52. The data collection apparatus 41 includes: the first storage unit 411b configured to store the data which are transmitted among the control apparatuses 21, 22 and the data collection apparatuses 41 to 43 by scan transmission; the group selector 431 configured to divide the memory area in the first storage unit 411b into multiple groups, to further divide the memory area in each group into multiple subgroups, and to select one or more divided subgroups as a collection group, which is a unit to continuously read data in the group, in order to avoid decrease in the data readout speed, on the basis of the data transfer rate characteristic corresponding to the data size; the collection group assigner 432 configured to assign the collection groups selected by the group selector 431 to the data collection apparatuses 41 to 43 in order to distribute the load of data collection among the data collection apparatuses 41 to 43; the schedule generator 433 configured to generate the schedule for reading the data from the first storage unit 411b per unit time, on the basis of the collection cycle for the data collection and the number of collection groups assigned to the data collection apparatus 41 by the collection group assigner 432; the data reader 436 configured to read the data from the first storage unit 411b on the basis of the schedule generated by the schedule generator 433; and the second storage unit 412 configured to store the data read by the data reader 436. Each of the data collection apparatuses 42, 43 includes: the first storage unit 411b configured to store the data which are transmitted among the control apparatuses 21, 22 and the data collection apparatuses 41 to 43 by scan transmission; the schedule generator 443 configured to generate the schedule for reading the data from the first storage unit 411b per unit time, on the basis of the collection cycle for the data collection and the number of collection groups assigned to the data collection apparatus 42 by the collection group assigner 432; the data reader 436 configured to read the data from the first storage unit 411b on the basis of the schedule generated by the schedule generator 443; and the second storage unit 412 configured to store the data read by the data reader 436. For these reasons, the data collection system 1 is capable of collecting the data without decreasing the data transfer process rate even though the multiple data collection apparatuses 41 to 43 collect the data in a distributed manner.

Figure 10:
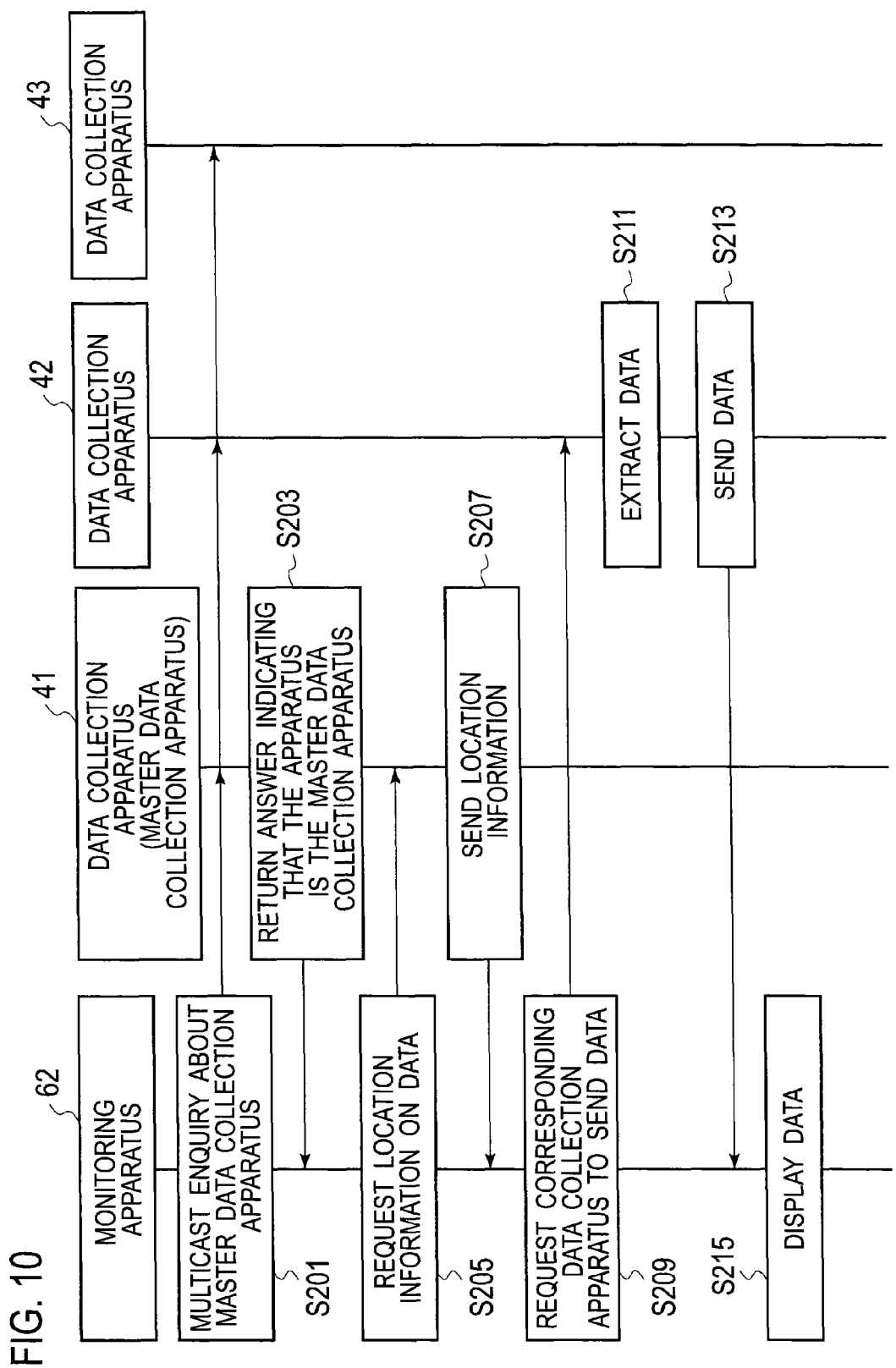
FIG. 10 is a sequence diagram showing procedures of processing to be performed by the data collection system of the first embodiment of the present invention.

FIG. 10 is a sequence diagram showing procedures of processing to be performed by the data collection system 1 of the first embodiment of the present invention.

As shown in FIG. 10, the location information requesting unit 62a in the monitoring apparatus 62 multicasts a signal to each of all the apparatuses connected to the control network 52, enquiring whether or not the apparatus is the master data apparatus (step S201).

In response to the multicast in step S201, the apparatus set as the master data collection apparatus sends the monitoring apparatus 62 a signal indicating that the apparatus is the master data collection apparatus (step S203). In this case, since the data collection apparatus 41 is set as the master data collection apparatus, the data collection apparatus 41 sends the monitoring apparatus 62 the signal indicating that the data collection apparatus 41 is the master data collection apparatus.

Subsequently, upon reception of the signal from the data collection apparatus 41 to indicate that the data collection apparatus 41 is the master data collection apparatus, the location information requesting unit 62a in the monitoring apparatus 62 requests the data collection apparatus 41 serving as the master data collection apparatus to send the location information indicating which of the data collection apparatuses 41 to 43 stores the data to be collected (step S205).

Once the data collection apparatus 41 is requested by the monitoring apparatus 62 to send the location information on the data, the data collection apparatus 41 sends the monitoring apparatus 62 the location information (step S207). To put it specifically, the notifier 437 in the data collection apparatus 41 gives the information on the data collection apparatus to which the collection groups including the data are assigned, as the location information on the data. In this respect, if the data collection apparatus 42 is that to which the collection groups including the data are assigned, the notifier 437 in the data collection apparatus 41 gives information uniquely identifying the data collection apparatus 42, such as an IP address thereof, as the location information on the data.

Thereafter, on the basis of the location information sent from the data collection apparatus 41 as the response to the request from the location information requesting unit 62a, the data requesting unit 62b in the monitoring apparatus 62 requests the data collection apparatus 42 to send the data (step S209).

Once the data collection apparatus 42 is requested by the monitoring apparatus 62 to send the data, the extractor 438 in the data collection apparatus 42 extracts the requested data from the second storage unit 412 (step S211), and sends the read data to the monitoring apparatus 62 (step S213).

The display control unit 62c in the monitoring apparatus 62 causes the display apparatus 61 to display the data which are sent as the response of the data collection apparatus 42 to the request from the data requesting unit 62b (step S215).

As described above, in the data collection system 1 of the first embodiment of the present invention, the monitoring apparatus 62 includes: the location information requesting unit 62a configured to request the data collection apparatus 41 to send the location information on the data collection apparatus which stores the data; the data requesting unit 62b configured to request the data collection apparatus 42 indicated by the location information to send the data on the basis of the location information which is sent from the data collection apparatus 41 as the response to the request from the location information requesting unit 62a; and the display control unit 62c configured to cause the display apparatus 61 to display the data which are sent as the response of the data collection apparatus to the request from the data requesting unit 62b. The data collection apparatus 41 includes the notifier 437 configured to send the information on the data collection apparatus 42 to which the collection groups including the data are assigned, as the location information on the data, once requested by the monitoring apparatus 62 to send the location information on the data. The data collection apparatus 42 includes the extractor 438 configured to extract the requested data from the second storage unit 412 and send the read data to the monitoring apparatus 62 once requested by the monitoring apparatus 62 to send the data. For these reasons, the data collection system 1 enables a user operating the monitoring apparatus 62 to retrieve and review the data without paying specific attention to which of the data collection apparatuses 41 to 43 stores the data even though the data are stored in the data collection apparatuses 41 to 43 in a distributed manner.

It should be noted that although in the first embodiment of the present invention, the data collection apparatus 41 selects the collection groups on the basis of the collection group patterns shown in FIG. 7, the collection group patterns are not limited to what are shown in FIG. 7.

For example, in the first embodiment of the present invention, the group pattern 501c is indicated with "■ □ ■□." In this case, the collection group pattern 503c is indicated as "■ □ ■." If, judging from the transfer rate characteristic, the transfer rate, namely the readout speed is faster when the subgroups 502a, 502c are read one by one than when the subgroups 502a to 502c which includes the subgroup 502b intervening between the subgroups 502a, 502c are read, then the collection group pattern 503c may be set as "■ ■." In other words, only the subgroups 501a, 502c may be read.

Furthermore, when the data collection is started, a transfer rate at which to perform the readout from the subgroups 502a to 502c and a transfer rate at which to perform the readout from the subgroups 502a, 502c one by one may be measured. Then, the mode with the faster transfer rate may be employed.

Moreover, although the first embodiment of the present invention has been described by citing the data collection system 1 which includes the control apparatuses 21, 22 and the data collection apparatuses 41 to 43 connected together via the control network 52, the configuration is not limited to this. A configuration may be employed in which the data collection system 1 further includes backup apparatuses provided to the respective data collection apparatuses 41 to 43 for data backup purposes.

What is more, the foregoing embodiment may be realized by causing a computer to execute a data collection program installed therein. To put it specifically, the data collection apparatuses may be constructed in a way that: the data collection program is read from a storage medium in which the data collection program is stored in advance, and is executed by the CPU 414. Alternatively, the data collection apparatuses may be constructed in a way that the data collection program is transmitted via a communications network, installed, and executed by the CPU 414. Similarly, the data collection apparatuses 41 to 43 and the monitoring apparatus 62 may be constructed by executing a data collection system program.

EXPLANATION OF REFERENCE SIGNS 1 data collection system
21 to 23 control apparatus
41 data collection apparatus (master data collection apparatus)
42, 43 data collection apparatus
51 host network
52 control network
61 display apparatus
62 monitoring apparatus
62a location information requesting unit
62b data requesting unit
62c display control unit
411 first network card
411a timer
411b first storage unit
411c first storage controller
411d transmitter
412 second storage unit
413 second network card
414, 424 CPU
414a to 414d microprocessor core
414e CPU core
417 bus
421 first network card
421d synchronizer
424 CPU
424e CPU core
431 group selector
432 collection group assigner
433 schedule generator
434 time calculator
435 judgment unit
436 data reader
437 notifier
438 extractor
443 schedule generator

INDUSTRIAL APPLICABILITY

The present invention is applicable to a data collection system for collecting plant data, and the like.

The invention claimed is:
1. A data collection system comprising a data collection apparatus and a master data collection apparatus which are connected to a control apparatus via a network,
the master data collection apparatus comprising one or more first circuits configured to:
store, on a master scan data storage, data which are transmitted among the control apparatus, the data collection apparatus and the master data collection apparatus by scan transmission;
divide a memory area in the master scan data storage into a plurality of groups;
divide a memory area in each group of the plurality of groups into a plurality of subgroups;
select at least one of the divided subgroups as a collection group, which is a unit to continuously read data in the collection group, in order to avoid decrease in a read speed of the data, on the basis of a reading pattern for the collection group, the reading pattern being predetermined according to the data transfer rate characteristic corresponding to a size of the data and indicating whether the collection group stores the data to be read;

assign a plurality of collection groups selected by the one or more first circuits to the data collection apparatus and the master data collection apparatus in order to distribute load of collection of the data between the data collection apparatus and the master data collection apparatus;

generate a first schedule for reading the data from the master scan data storage per unit time, on the basis of a collection cycle for collecting the data and a first number of collection groups assigned to the master data collection apparatus by the one or more first circuits;

read the data from the master scan data storage on the basis of the first schedule generated by the one or more first circuits; and store the data read by the one or more first circuits, and the data collection apparatus comprising one or more second circuits configured to:

store, on a scan data storage, the data which are transmitted among the control apparatus, the data collection apparatus and the master data collection apparatus by scan transmission;

generate a second schedule for reading the data from the scan data storage per unit time, on the basis of the collection cycle for collecting the data and a second number of collection groups assigned to the data collection apparatus by the one or more first circuits;

read the data from the scan data storage on the basis of the second schedule generated by the one or more second circuits; and store the data read by the one or more second circuits.

2. The data collection system of claim 1, further comprising a monitoring apparatus which comprises one or more third circuits configured to:

request the master data collection apparatus to send location information on the data collection apparatus in which the data are stored;

request the data collection apparatus indicated by the location information to send the data on the basis of the location information which is sent from the master data collection apparatus as a response to the request from the one or more third circuits; and cause a display to display the data which are sent as a response of the data collection apparatus to the request from the one or more third circuits, wherein the one or more first circuits are further configured to notify the monitoring apparatus of the data collection apparatus to which the collection groups including the data are assigned, as the location information on the data, when the monitoring apparatus requests the master data collection apparatus to send the location information on the data, and the one or more second circuits are further configured to extract the requested data from the scan data storage, and to send the read data to the monitoring apparatus, when the monitoring apparatus requests the data collection apparatus to send the data.

3. The data collection system of claim 1, wherein the one or more first circuits are further configured to:

calculate an amount of time that the one or more first circuits take to read the data per unit time, as a needed readout time, on the basis of the first schedule generated by the one or more first circuits; and determine whether or not the reading of the data from the master scan data storage is to be completed within the unit time according to the needed readout time calculated by the one or more first circuits.

4. The data collection system of claim 3, wherein when the needed readout time is equal to or greater than a threshold length of time obtained by subtracting a predetermined time allowance from the unit time, the one or more first circuits are configured to determine that the reading of the data is not to be completed within the unit time, and issue a warning to be displayed on the display, and when the needed readout time is lower than the threshold length of time, the one or more first circuits are configured to determine that the reading of the data is to be completed within the unit time, and to read the data from the master scan data storage.

5. A non-transitory computer readable medium comprising computer program instructions, when executed by a data collection system including a data collection apparatus and a master data collection apparatus which are connected to a control apparatus via a network, the master data collection apparatus including one or more first circuits and the data collection apparatus including one or more second circuits, the computer program instructions causing the one or more first circuits to:

store, on a master scan data storage, data which are transmitted among the control apparatus, the data collection apparatus and the master data collection apparatus by scan transmission;

divide a memory area in the master scan data storage into a plurality of groups, divide a memory area in each group of the plurality of groups into a plurality of subgroups;

select at least one of the divided subgroups as a collection group, which is a unit to continuously read data in the collection group, in order to avoid decrease in a readout speed of the data, on the basis of a reading pattern for the collection group, the reading pattern being predetermined according to the data transfer rate characteristic corresponding to a size of the data and indicating whether the collection group stores the data to be read;

assign a plurality of the collection groups selected by the one or more first circuits to the data collection apparatus and the master data collection apparatus in order to distribute load of collection of the data between the data collection apparatus and the master data collection apparatus;

generate a schedule for reading the data from the master scan data storage per unit time, on the basis of a collection cycle for collecting the data and a first number of collection groups assigned to the master data collection apparatus by the one or more first circuits;

read the data from the master scan data storage unit on the basis of the schedule generated by the one or more first circuits; and store the data read by the one or more first circuits, and the computer program instructions causing the one or more second circuits to:

store, on a scan data storage, the data which are transmitted among the control apparatus, the data collection apparatus and the master data collection apparatus by scan transmission;

generate a schedule for reading the data from the scan data storage per unit time, on the basis of the collection cycle for collecting the data and a second number of collection groups assigned to the data collection apparatus by the one or more first circuits;

read the data from the scan data storage on the basis of the schedule generated by the one or more second circuits; and store the data read by the one or more second circuits.

6. The non-transitory computer readable medium comprising computer program instructions according to claim 5, wherein the data collection system further comprises a monitoring apparatus including one or more third circuits, the computer program instructions causes the one or more third circuits to:

request the master data collection apparatus to send location information on the data collection apparatus in which the data are stored;

request the data collection apparatus indicated by the location information to send the data on the basis of the location information which is sent from the master data collection apparatus as a response to the request from the one or more third circuits; and cause a display to display the data which are sent as a response of the data collection apparatus to the request from the one or more third circuits, the computer program instructions causes the one or more first circuits to notify the monitoring apparatus of the data collection apparatus to which the collection groups including the data are assigned, as the location information on the data, when the monitoring apparatus requests the master data collection apparatus to send the location information on the data, and the computer program instructions causes the one or more second circuits to extract the requested data from the scan data storage, and to send the read data to the monitoring apparatus, when the monitoring apparatus requests the data collection apparatus to send the data.

7. The non-transitory computer readable medium comprising computer program instructions according to claim 5, wherein the computer program instructions causes the one or more first circuits to:

calculate an amount of time that the one or more first circuits take to read the data per unit time, as a needed readout time, on the basis of the first schedule generated by the one or more first circuits; and determine whether or not the reading of the data from the master scan data storage is to be completed within the unit time according to the needed readout time calculated by the one or more first circuits.

8. The non-transitory computer readable medium comprising computer program instructions according to claim 7, wherein when the needed readout time is equal to or greater than a threshold length of time obtained by subtracting a predetermined time allowance from the unit time, the one or more first circuits are caused to determine that the reading of the data is not to be completed within the unit time, and issue a warning to be displayed on the display, and when the needed readout time is lower than the threshold length of time, the one or more first circuits are caused to determine that the reading of the data is to be completed within the unit time, and to read the data from the master scan data storage.

* * * * *